(12) United States Patent
Sandberg

(10) Patent No.: US 11,953,878 B2
(45) Date of Patent: Apr. 9, 2024

(54) METHOD AND SYSTEM FOR CONDITION MONITORING OF A CYCLICALLY MOVING MACHINE COMPONENT

(71) Applicant: Tetra Laval Holdings & Finance S.A., Pully (CH)

(72) Inventor: Daniel Sandberg, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 383 days.

(21) Appl. No.: 17/295,842

(22) PCT Filed: Nov. 19, 2019

(86) PCT No.: PCT/EP2019/081742
§ 371 (c)(1),
(2) Date: May 20, 2021

(87) PCT Pub. No.: WO2020/109071
PCT Pub. Date: Jun. 4, 2020

(65) Prior Publication Data
US 2022/0011741 A1   Jan. 13, 2022

(30) Foreign Application Priority Data
Nov. 27, 2018   (EP) ..................................... 18208543

(51) Int. Cl.
*G05B 19/4065* (2006.01)
(52) U.S. Cl.
CPC ............... *G05B 19/4065* (2013.01); *G05B 2219/37228* (2013.01)
(58) Field of Classification Search
CPC ...... G05B 19/4065; G05B 2219/37228; G05B 23/0235; G07C 3/00
See application file for complete search history.

(56) References Cited

U.S. PATENT DOCUMENTS

| 6,370,957 B1* | 4/2002 | Filippenko | G01H 1/003 73/659 |
| 2017/0315516 A1* | 11/2017 | Kozionov | G06F 17/142 |
| 2019/0301979 A1* | 10/2019 | Kawanoue | G05B 23/0254 |

FOREIGN PATENT DOCUMENTS

| CN | 106908232 A | 6/2017 |
| EP | 1 298 511 A1 | 4/2003 |
| WO | WO 2016/089238 A1 | 6/2016 |

OTHER PUBLICATIONS

International Search Report and Written Opinion issued in PCT/EP2019/081742 dated Feb. 17, 2020.

* cited by examiner

*Primary Examiner* — Kenneth M Lo
*Assistant Examiner* — Mohammed Shafayet
(74) *Attorney, Agent, or Firm* — Knobbe, Martens, Olson & Bear, LLP

(57) ABSTRACT

A method (1000) for condition monitoring is disclosed, comprising registering (1010) values ($v_1$) of movement characteristics measured for cycles of motion of a cyclically moving machine, associating (1050) the occurrence of values in a frequency distribution ($F_{v1}$) of the values with respective defined indexes (a, b, c, . . . ) based on intervals, generating (1060) a word string (S) of the defined indexes corresponding to the occurrence of the values, segmenting (1070) said word string (S) into a sub-set of words ($s_1, s_2, \ldots, s_i$), determining (1080) a frequency of the occurrence of the segmented words in said word string as a first reference term frequency ($TF_1$), associated with a first machine status ($M^1$), for subsequently registered set of values of movement characteristics, determining (1100) a subsequent term frequency ($TF_n$), comparing (1110) the subsequent term frequency ($TF_n$) with the first reference term frequency to determine a correlation with the first machine status.

18 Claims, 8 Drawing Sheets

|  | $TF_1$ | $TF_n$ |
|---|---|---|
| cbbbcccb | 7 | 2 |
| bbbbaaaa | 38 | 23 |
| ⋮ |  |  |
| baaaaaaa | 19 | 5 |

$M^1$

|  | $TF_1$ | $TF_2$ | $TF_n$ |
|---|---|---|---|
| cbbbcccb | 7 | 1 | 3 |
| bbbbaaaa | 38 | 21 | 25 |
| ⋮ | | | |
| baaaaaaa | 19 | 8 | 7 |

$M^1 \nearrow \quad M^2 \nearrow$

Fig. 6a

|  | $TF_1$ | $TF_2$ | $TF_n$ |
|---|---|---|---|
| cbbbcccb | $X_1^1$ | $X_2^1$ | $X_n^1$ |
| bbbbaaaa | $X_1^2$ | $X_2^2$ | $X_n^2$ |
| ⋮ | | | |
| baaaaaaa | $X_1^k$ | $X_2^k$ | $X_n^k$ |

$M^1 \nearrow \quad M^2 \nearrow$

Fig. 6b

|  | $TF_1$ | $TF_2$ | $ID*TF_1$ | $ID*TF_2$ |
|---|---|---|---|---|
| cbbbcccb | 10 | 5 | 0.67 | 0.335 |
| bbbbaaaa | 1 | 5 | 0.167 | 0.833 |
| bbaaaabb | 20 | 5 | 0.8 | 0.2 |
| ⋮ | | | | |
| baaaaaaa | 10 | 50 | 0.17 | 0.85 |

METHOD AND SYSTEM FOR CONDITION MONITORING OF A CYCLICALLY MOVING MACHINE COMPONENT

TECHNICAL FIELD

The present invention relates to a method of condition monitoring of a cyclically moving machine component, a related computer program product and an apparatus for condition monitoring of a cyclically moving machine component, such as bearings, belts, or motors, employed in systems such as filling machines or related systems for producing sealed packages.

BACKGROUND

Condition monitoring of machine components in production lines, such as in the manufacturing of sealed packages in filling—and packaging machines or related systems, is critical for ensuring a desired functionality over a period of time and fault prediction. Monitoring distortions in the movements of machine components is an essential part in achieving the desired functionality control and prevent wear-related breakdown. Such maintenance strategy is mainly possible thanks to the fact that once e.g. a bearing approaches failure, its vibrations changes characteristics which can be interpreted as a warning sign of the impending breakdown, and if this sign is detected timely it gives the operator a time frame to plan a maintenance activity and substitute the bearing without impacting production time. Distortion analysis of e.g. vibrations in bearings, belts, motors, or other cyclically or reciprocally moving components is an important part of industrial predictive maintenance programs so that wear and damages can be discovered and repaired before the machine breaks down, thus reducing operating and maintenance costs. Empirical evaluation of the motion characteristics of e.g. a bearing is an error-prone activity that may lead to significantly underestimate or overestimate the remaining lifetime of the component. A problem with previous solutions for condition monitoring is thus lack of accuracy, as well as complex implementation thereof. Previous solutions typically also makes various assumptions with regards to the model used for the calculations. In particular, it is typically assumed that there is no slip during the relative motion of e.g. bearing elements; that there is a localized damage on the bearing; that the motor to which the bearing is attached to rotates at a constant speed; and during the motor operation, the damage causes a series of short-duration impacts, that generate a train of spikes in the frequency spectrum of the vibration signal with a certain periodicity; and that there is a frequency band where the signal-to-noise ratio is such that the train of impulses is detectable. If these conditions are not verified, the train of peaks may be smeared so that it is not recognizable anymore, or can be hidden among other kinds of noise. The assumption of constant rotation speed of the servomotors is severe limitation in the field of automatic machines, where usually a number of servomotors are employed as electric cams and operated at a variable speed in order to obtain variable speed profiles of the actuated elements. Methods are employed to accommodate for variable speeds, but such solutions can also be complex to implement and also associated with other limitations and undesirable assumptions.

SUMMARY

It is an object of the invention to at least partly overcome one or more limitations of the prior art. In particular, it is an object to provide for an improved condition monitoring of a cyclically moving machine component, and in particular providing a less complex method of fault prediction and method for reliably and timely detecting deviant behavior or impending breakdown, in order to give the operator a time frame to plan a maintenance activity and substitute the relevant components without impacting production In a first aspect of the invention, this is achieved by a method for condition monitoring of a cyclically moving machine component, wherein cycles of a motion of the machine component generates measurable movement characteristics. The method comprises registering values of the movement characteristics measured for the cycles, generating a frequency distribution of the registered values, defining intervals for the occurrence of values in the frequency distribution, associating the intervals with defined indexes, associating the occurrence of values in the frequency distribution with respective defined indexes based on the intervals, generating a word string of the defined indexes corresponding to the occurrence of values in the frequency distribution, segmenting said word string into a sub-set of segmented words of the defined indexes, determining a frequency of the occurrence of the segmented words in said word string as a first reference term frequency, associating the first reference term frequency with a first machine component status, for a subsequently registered set of values of movement characteristics, determining a corresponding subsequent term frequency, and comparing the subsequent term frequency with the first reference term frequency to determine a correlation with the first machine component status.

In second aspect of the invention, this is achieved by an apparatus for condition monitoring of a cyclically moving machine component, wherein cycles of a motion of the machine component generates measurable movement characteristics. The apparatus comprises a processor configured to register values of movement characteristics measured for the cycles, generate a frequency distribution of the registered values, define intervals for the occurrence of values in the frequency distribution, associate the intervals with defined indexes, associate the occurrence of values in the frequency distribution with respective defined indexes based on the intervals, generate a word string of the defined indexes corresponding to the occurrence of values in the frequency distribution, segment said word string into a sub-set of segmented words of defined indexes, determine a frequency for the occurrence of the segmented words in said word string as a first reference term frequency, associate the first reference term frequency with a first machine component status, for a subsequently registered set of values of movement characteristics, determine a corresponding subsequent term frequency, compare the subsequent term frequency with the first reference term frequency to determine a correlation with the first machine component status.

In third aspect of the invention, this is achieved by a computer program product comprising instructions which, when the program is executed by a computer, cause the computer to carry out the steps of the method according to the first aspect.

Further examples of the invention are defined in the dependent claims, wherein features for the first aspect may be implemented for the second and subsequent aspects, and vice versa.

Generating a word string of defined indexes corresponding to the occurrence of values of movement characteristics in a frequency distribution, determining a reference term frequency of segmented words in the word string, and for subsequently registered set of values of movement characteristics, determining a subsequent term frequency for comparison with the first reference term frequency and correlation with a machine status provides for an accurate classification of a condition of the machine component. A facilitated condition monitoring of a cyclically moving machine component is thus provided for reliably and timely detecting deviant behavior or impending breakdown.

Still other objectives, features, aspects and advantages of the invention will appear from the following detailed description as well as from the drawings.

DRAWINGS

Embodiments of the invention will now be described, by way of example, with reference to the accompanying schematic drawings.

Figure 2:
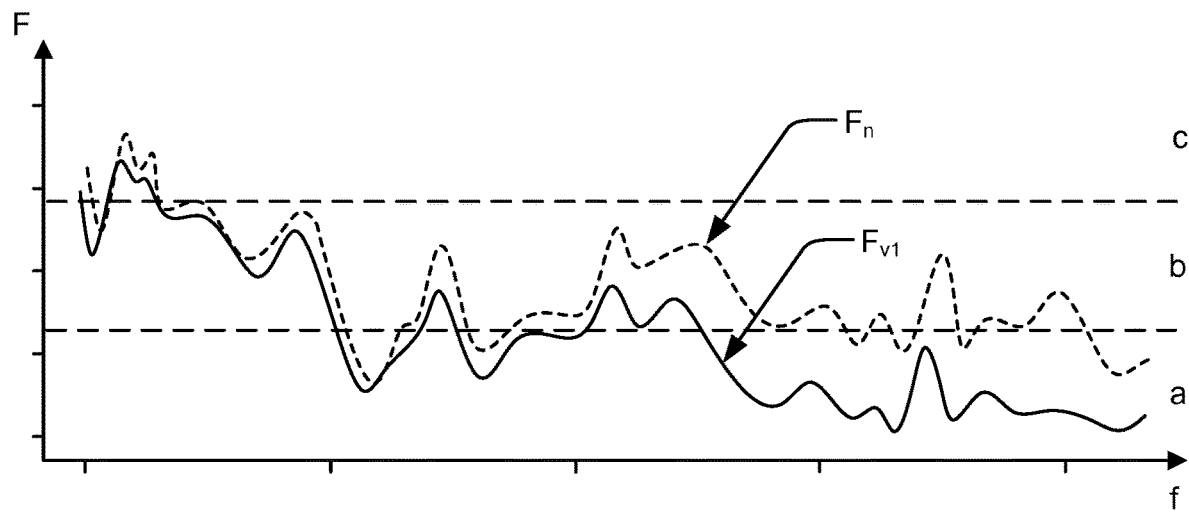
FIG. 2 is a diagram illustrating a frequency distribution of the values in FIG. 1 and an example of a frequency distribution of a subsequently registered set of values of movement characteristics.
Figure 3A:
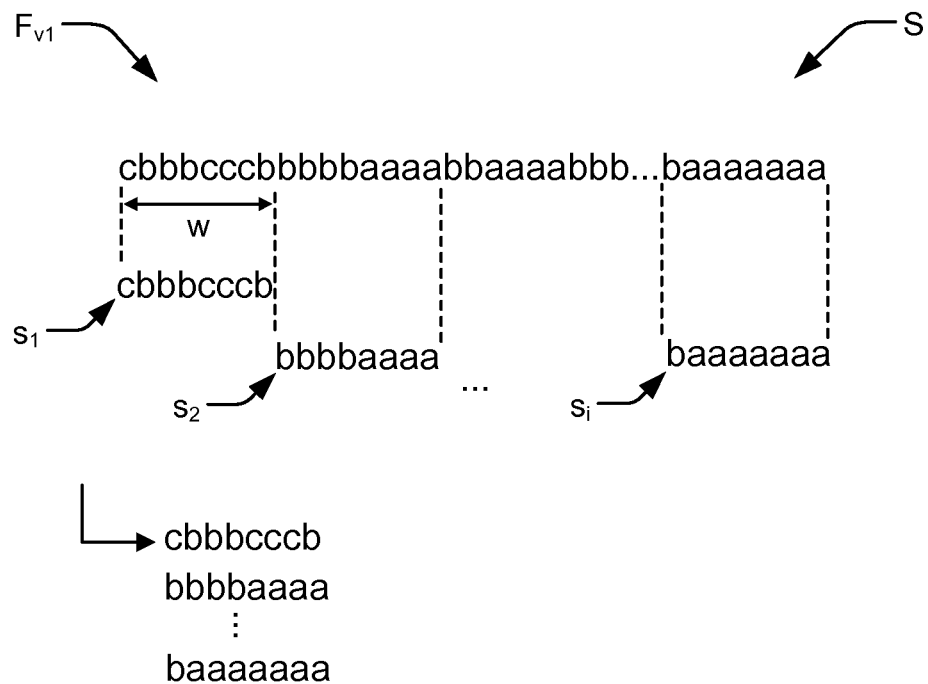
Figure 3B:
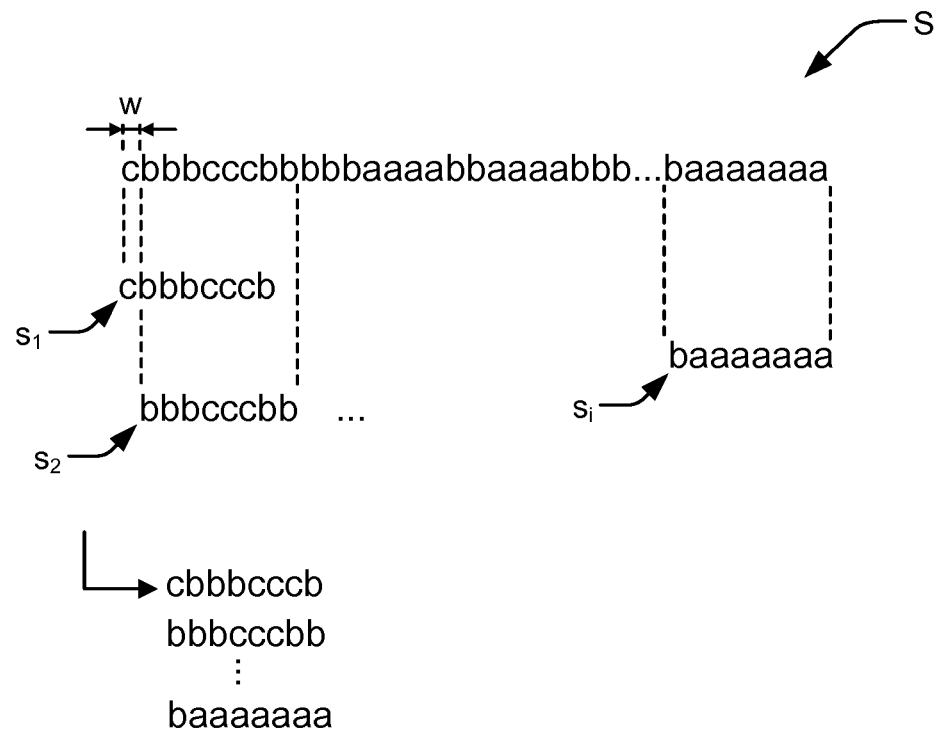
Figures 4, 5:
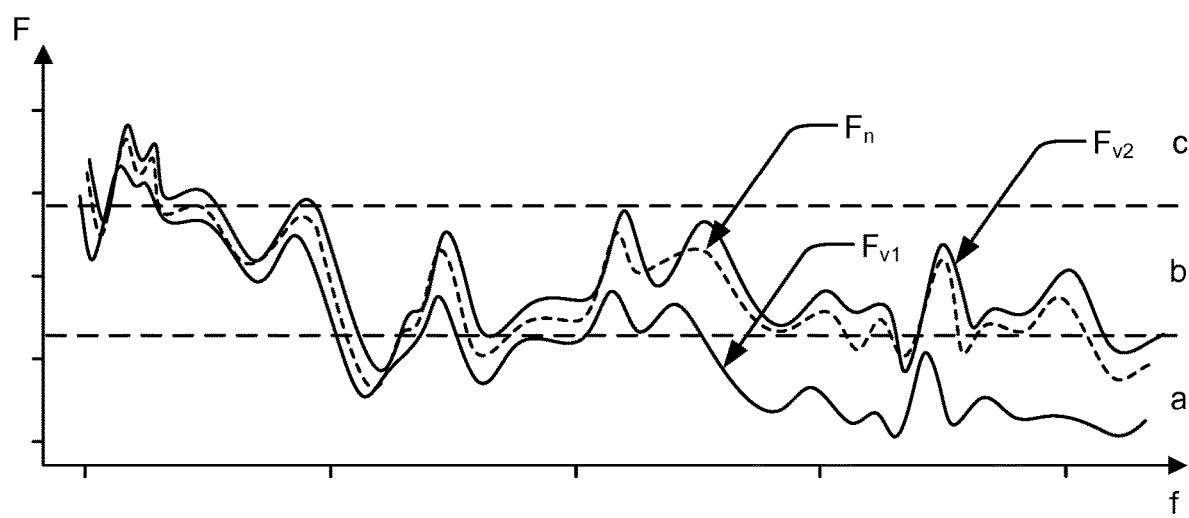
Figures 7A, 7B:
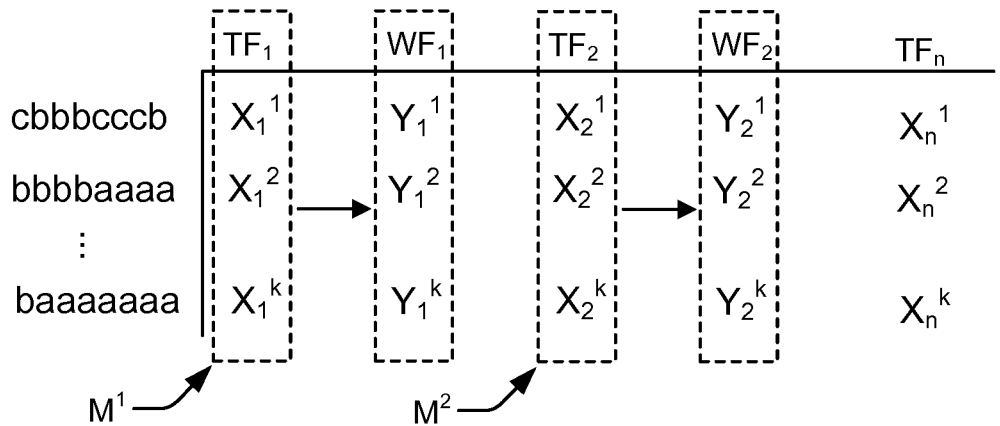
Figure 8A:
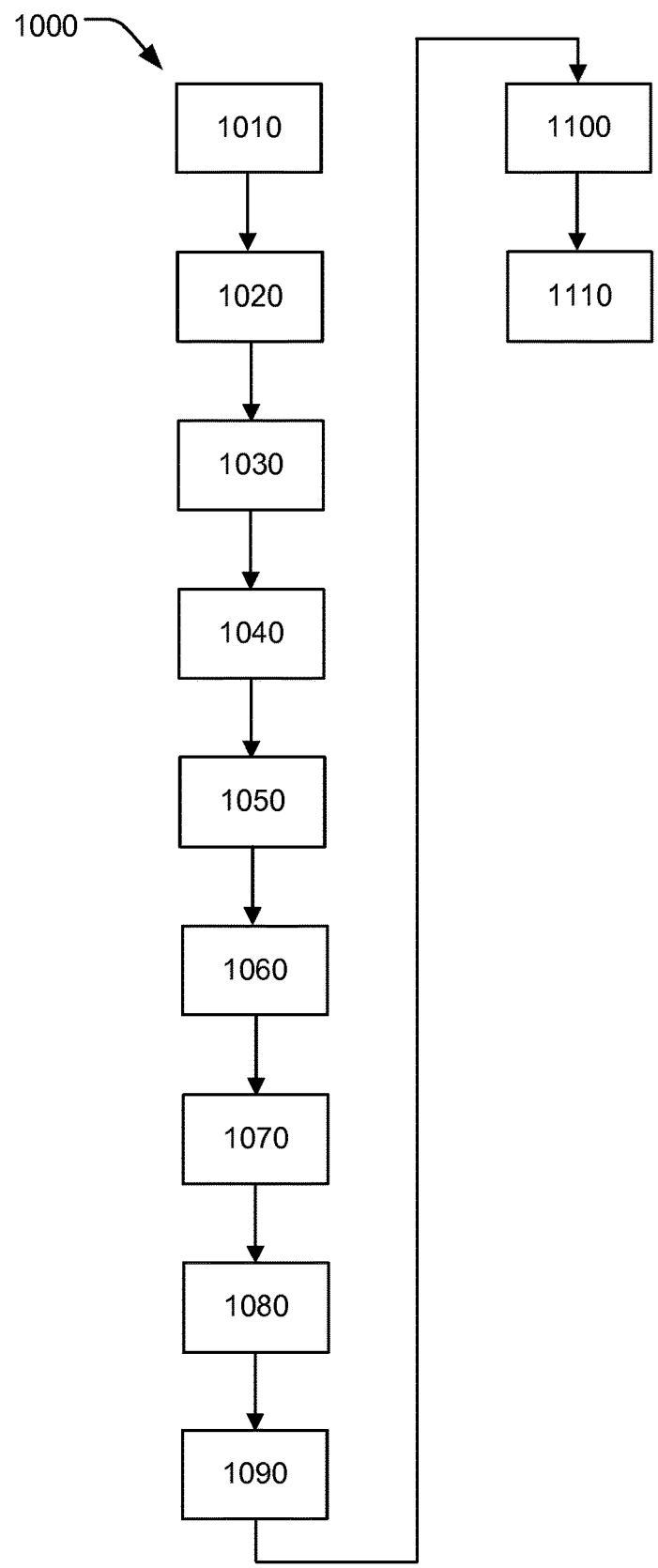
Figure 8B:
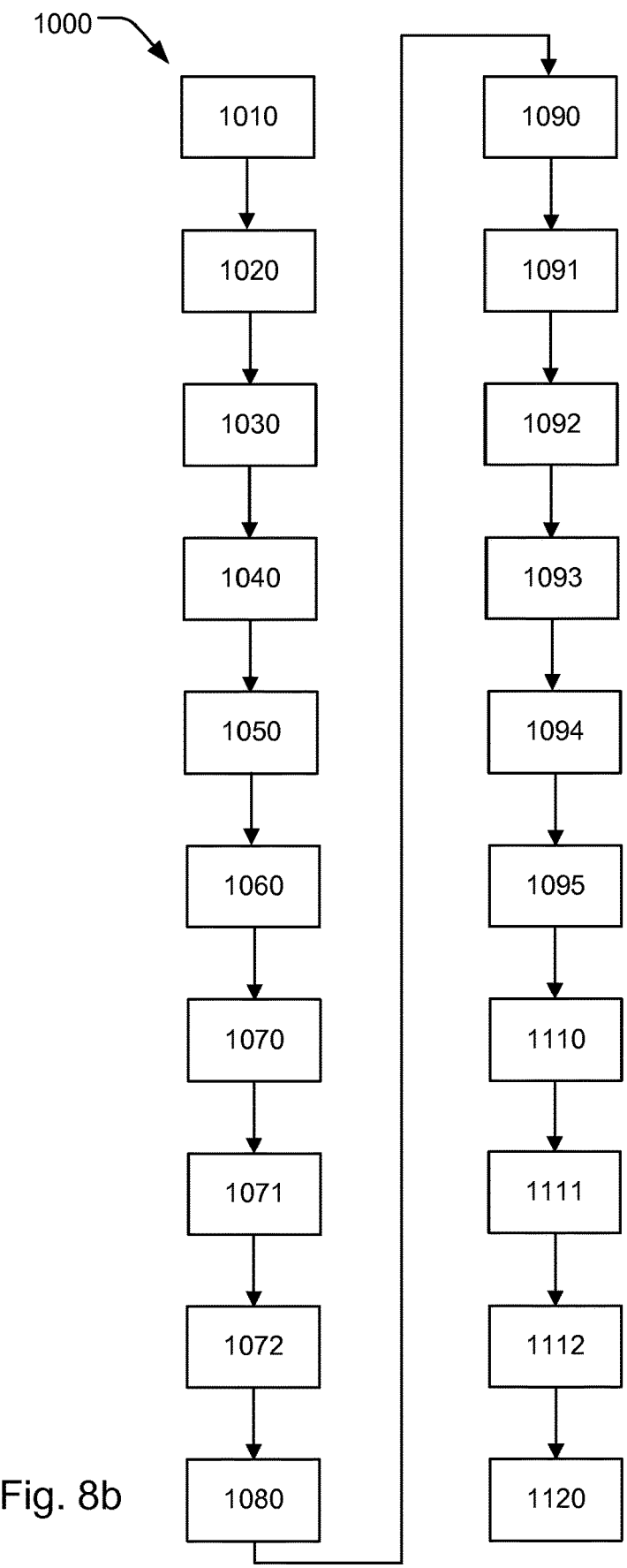
Figure 8C:
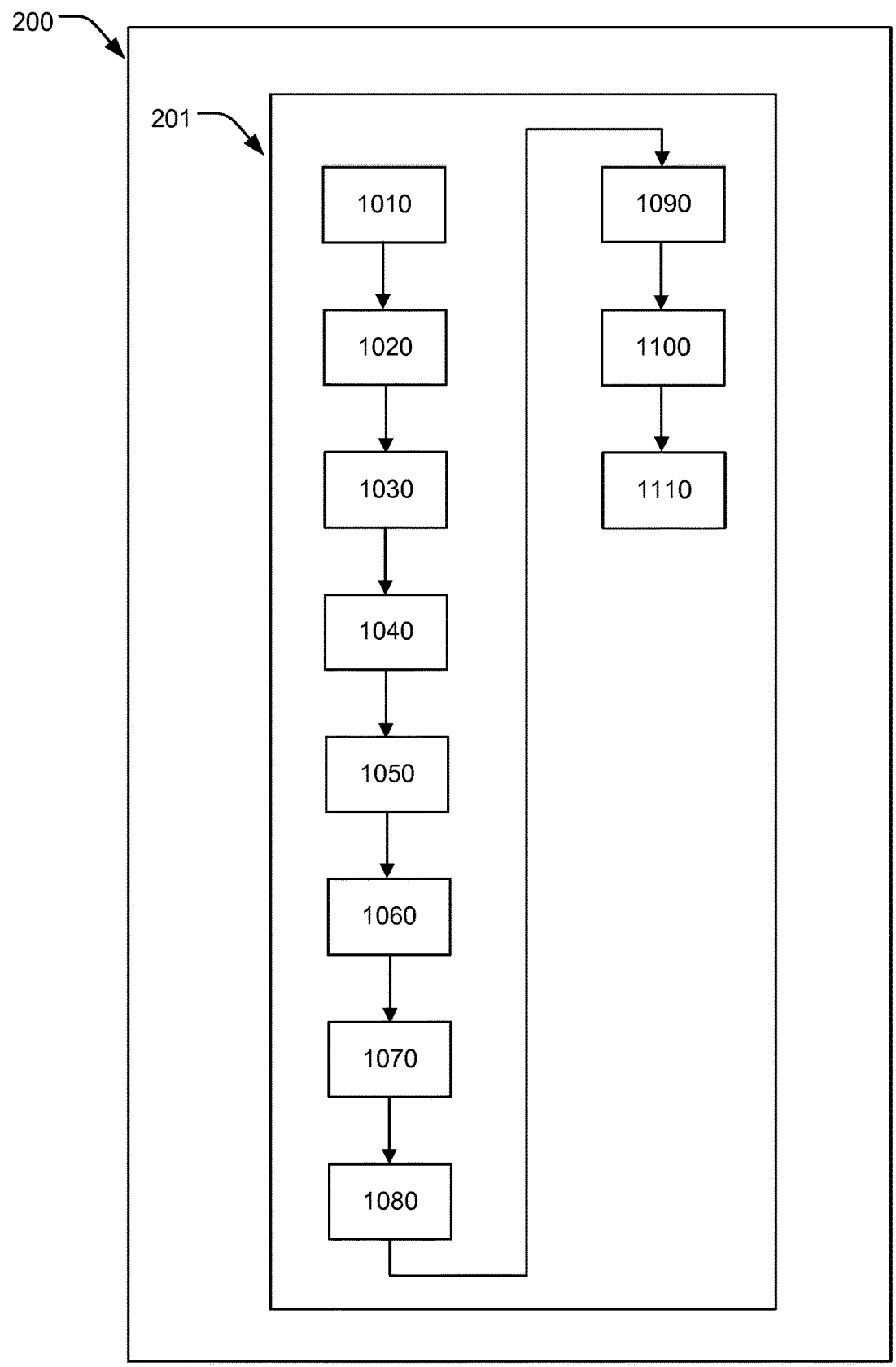

FIGS. 3a-b are illustrations of segmenting a word string of defined indexes associated with the occurrence of values in the frequency distribution in FIG. 2;

FIG. 4 is an illustration of term frequencies of segmented words of defined indexes associated with the occurrence of values in a frequency distribution;

FIG. 5 is a diagram illustrating further examples of frequency distributions of values of movement characteristics of a cyclically moving machine component;

FIGS. 6a-b are illustrations of term frequencies of segmented words of defined indexes associated with the occurrence of values in frequency distributions;

FIGS. 7a-b are illustrations of term frequencies of segmented words of defined indexes associated with the occurrence of values in frequency distributions;

FIG. 8a is a flowchart of a method for condition monitoring of a cyclically moving machine component;

FIG. 8b is another flowchart of a method for condition monitoring of a cyclically moving machine component; and FIG. 8c is a schematic illustration of an apparatus for condition monitoring of a cyclically moving machine component.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
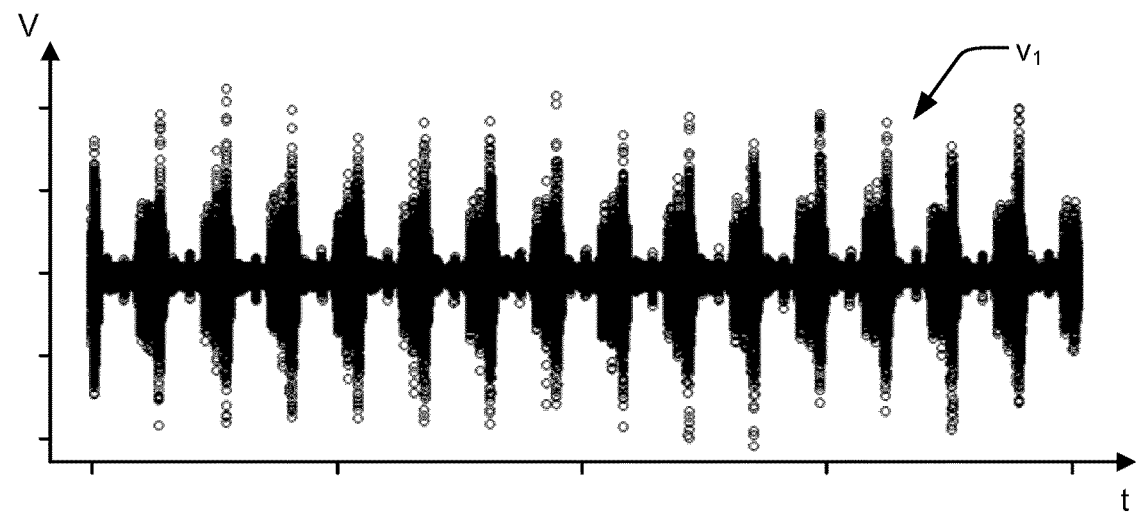
FIG. 1 is a diagram illustrating values of movement characteristics measured for a plurality of cycles of motion of a cyclically moving machine component.

FIG. 8a is a flowchart of a method 1000 for condition monitoring of a cyclically moving machine component (not shown). Cycles of a motion of the machine component generates measurable movement characteristics. FIG. 1 illustrates an example of values ($v_1$) of measurable movement characteristics obtained over a plurality of cycles of a motion of the machine component. The values ($v_1$) in FIG. 1 may represent an amplitude of a movement, such as a vibrational movement, as function of time (t). It is conceivable that various other measurable movement characteristics of the motion cycles can be determined for the purposes of carrying out the method 1000, such as values of displacement, torque or any other force, speed, or acceleration describing the movement of the machine component during the cycles. The method 1000 thus comprises registering or determining 1010 values ($v_1$) of the movement characteristics measured for the aforementioned motion cycles. The values such as illustrated in the example of FIG. 1 may be retrieved, e.g. by employing various types of sensors configured to measure the mentioned movement characteristics. The method 1000 comprises generating 1020 a frequency distribution ($F_{v1}$) of the registered values. An example of such frequency distribution ($F_{v1}$) is shown in FIG. 2. The occurrence (F) of the values ($v_1$) is shown along the y-axis, and the frequency (f) is shown along the x-axis. Thus, in the example of FIG. 2, there is a higher occurrence at the low frequencies, e.g. a greater number of low frequency vibrations, than at the high frequencies. The transformation to the frequency domain may be carried out by fast Fourier transform methods. Smoothing may be applied on e.g. a periodogram of the data in the frequency domain. The method 1000 comprises defining 1030 intervals for the occurrence of values in the frequency distribution ($F_{v1}$), as schematically illustrated by the dashed lines in FIG. 2. The intervals may be optimized to the particular application, and may be varied in number and in length. FIG. 2 shows an example of three essentially equally divided intervals. In other examples, the number of intervals may be set to 5, 10, 20, or more intervals, being equally divided or having variable lengths depending on the application. Segments of the data having a greater variation in the occurrence of the values may benefit from having an increased number of narrow intervals to capture finer variations. The method 1000 comprises associating 1040 the intervals with defined indexes (a, b, c, . . . ), and associating 1050 the occurrence of values in the frequency distribution ($F_{v1}$) with the respective defined indexes (a, b, c, . . . ) based on the intervals. Hence, each value in the frequency distribution ($F_{v1}$) is assigned an index (a, b, c, . . . ), according to the particular interval in which the value lies.

The method 1000 comprises generating 1060 a word string (S) of the defined indexes (a, b, c, . . . ) corresponding to the occurrence of values in the frequency distribution ($F_{v1}$). An example of such word string (S) is shown in FIG. 3a. The word string (S) is thus a string in which each of the indexes (a, b, c, . . . ) of the values in the frequency distribution ($F_{v1}$) are arranged in sequence, across the frequency range (f) of FIG. 2. The method 1000 comprises segmenting 1070 the word string (S) into a sub-set of segmented words ($s_1, s_2, \ldots, s_i$) of the defined indexes (a, b, c, . . . ), as schematically illustrated in FIGS. 3a-b. As will be explained further below, the word string (S) may be segmented in the segmented words ($s_1, s_2, \ldots, s_i$) by different step lengths (w). An array of segmented words ($s_1, s_2, \ldots, s_i$) is thus obtained. The method 1000 comprises determining 1080 a frequency of the occurrence of the segmented words ($s_1, s_2, \ldots, s_i$) in the word string (S) as a first reference term frequency ($TF_1$). FIG. 4 is an example where the frequency of the occurrence of the segmented words is shown for three different words. E.g. the word 'bbbbaaa' occurs 38 times in the word string (S) which is based on the frequency distribution $F_{v1}$. The method 1000 comprises associating 1090 the first reference term frequency ($TF_1$) with a first machine component status ($M^1$), which may correspond to a known machine component status, such as a healthy or faulty machine component status. A reference status, represented by the reference term frequency ($TF_1$), may thus be defined. At a different point in time, the machine component may have undergone changes, such as having developed a defect behavior or having undergone other processes, which may be reflected in subsequently measured movement characteristics. The method 1000 comprises, for a subsequently registered set of values of movement characteristics, determining 1100 a corresponding subsequent term frequency ($TF_n$). The subsequent term frequency ($TF_n$) may thus be determined as described above for the reference term frequency ($TF_1$). FIG. 2 shows an example of a frequency distribution ($F_n$) of the subsequently registered set of values of movement characteristics. FIG. 4 shows an example of the subsequent term frequency ($TF_n$) for a subsequently registered set of values, along with the first reference term frequency ($TF_1$). The method 1000 further comprises comparing 1110 the subsequent term frequency ($TF_n$) with the first reference term frequency ($TF_1$) to determine a correlation with the first machine component status ($M^1$). Different statistical measures may be utilized to determine the relationship between the term frequencies ($TF_1$, $TF_n$), such as determining a relationship between mean- or dispersion values, or trends in the term frequencies ($TF_1$, $TF_n$). A statistical significant relationship may be identified if the resulting deviations, from such comparison, is within defined statistical limits or criteria. The degree of correlation may thus be within defined criteria, to identify the subsequently registered set of values of movement characteristics, associated with the subsequent term frequency ($TF_n$), as representing a machine component status which, to a defined degree, corresponds to the first machine component status ($M^1$). In case the aforementioned deviations indicate that the degree of correlation is outside a defined criteria, the subsequently registered set of values of movement characteristics, associated with the subsequent term frequency ($TF_n$), may likewise be classified as representing a machine component status which deviates from the first machine component status ($M^1$) with a statistically significant amount. The first machine component status ($M^1$) may be a defined known status of the cyclically moving machine component. Variations in the machine component over time may thus be identified, by comparing sets of values of movement characteristics, obtained at a different points in time, with the reference term frequency ($TF_1$), associated with the first machine component status ($M^1$), as described above.

Thus, generating a word string (S) of defined indexes (a, b, c, . . . ) corresponding to the occurrence of values of movement characteristics in a frequency distribution ($F_{v1}$), and determining a reference term frequency ($TF_1$) of segmented words ($s_1$, $s_2$, . . . , $s_i$) in the word string (S), while a subsequent term frequency ($TF_n$) of subsequently registered set of values of movement characteristics is determined for comparison with the reference term frequency ($TF_1$) to correlate with a machine status, provides for an accurate classification of a condition of the machine component. A facilitated condition monitoring of a cyclically moving machine component is thus provided for reliably and timely detecting deviant behavior or impending breakdown. The method 1000 thus provides for a robust and accurate condition monitoring, while being less complex to implement.

The method 1000 may comprise determining 1091 a second reference term frequency ($TF_2$) for values of movement characteristics measured for a second machine component status ($M^2$). The second machine component status ($M^2$) may correspond to a machine component having reduced functionality, while the first machine component status ($M^1$) may correspond to a calibrated reference machine component. The first and second reference term frequencies ($TF_1$, $TF_2$) may thus correspond to different conditions or classifications of the cyclically moving machine component. FIG. 5 shows an example of a frequency distribution ($F_{v2}$) of values of measurable movement characteristics obtained for a plurality of cycles in the second machine component status ($M^2$) of the machine component. FIG. 6a shows an example of a second reference term frequency ($TF_2$) associated with the occurrence of segmented words ($s_1$, $s_2$, . . . , $s_i$) obtained from such frequency distribution ($F_{v2}$). Hence, a set of reference term frequencies ($TF_1$, $TF_2$), is obtained for comparison to a subsequent term frequency ($TF_n$), as generally illustrated in FIG. 6b. It is conceivable that the subsequent term frequency ($TF_n$) may be obtained at any point in time, regardless of when the first and second reference term frequencies ($TF_1$, $TF_2$) have been determined, as long as the latter represent reference states of the machine component. The method 1000 may thus comprise comparing 1111 the subsequent term frequency ($TF_n$) with the first and second reference term frequencies ($TF_1$, $TF_2$) to determine a current machine component status, being associated with the subsequent term frequency ($TF_n$), as said first or second machine component status ($M^1$, $M^2$).

Thus, the degree of correlation with the first and second reference term frequencies ($TF_1$, $TF_2$) may be determined, to classify the subsequently registered set of values of movement characteristics, associated with the subsequent term frequency ($TF_n$), as representing the first or second machine component status ($M^1$, $M^2$). The example in FIGS. 4 and 5 shows a higher degree of correlation between the subsequently registered set of values of movement characteristics and the second machine component status ($M^2$), with respect to the associated frequency distributions ($F_{v2}$, $F_n$) and term frequencies ($TF_2$, $TF_n$), compared to the first machine component status ($M^1$). The current machine component status, represented by the subsequently registered set of values of movement characteristics, may thus be regarded as having a better resemblance to the second machine component status ($M^2$) than the first machine component status ($M^1$). This provides for an effective characterization of the machine component, where e.g. the transition from a healthy state to a defective state can be detected in an improved and facilitated manner.

The method 1000 may comprise determining 1092 weighted term frequencies ($WF_1$, $WF_2$) of the first and second reference term frequencies ($TF_1$, $TF_2$) based on a difference between the occurrence of the segmented words ($s_1$, $s_2$, . . . , $s_i$) in the first and second reference term frequencies ($TF_1$, $TF_2$). For example, a first segmented word ($s_1$) may occur a large number of times in both the first and second reference term frequencies ($TF_1$, $TF_2$), whereas a second segmented word ($s_2$) may occur only in the second reference term frequency ($TF_2$), or in a significantly larger number of times in the latter compared to the first reference term frequency ($TF_1$). In such case, the first segmented word ($s_1$) may be given significantly less weight in the weighted term frequencies ($WF_1$, $WF_2$), compared to the second segmented word ($s_2$). Thus, segmented words ($s_1$, $s_2$, . . . , $s_i$) that are unique in the respective series of first and second reference term frequencies ($TF_1$, $TF_2$) may be given a higher weight. The method 1000 may comprise comparing 1112 the subsequent term frequency ($TF_n$) with the weighted reference term frequencies ($WF_1$, $WF_2$) to determine the current machine component status. FIG. 7a is a schematic illustration showing the weighted reference term frequencies ($WF_1$, $WF_2$) determined for the segmented words ($s_1$, $s_2$, . . . , $s_i$). This provides for effectively identifying the closest match in machine status to the subsequent term frequency ($TF_n$). In the above mentioned example, the occurrence of the second segmented word ($s_2$), which was given a higher weight than the first segmented word ($s_1$), may be advantageously compared in the term frequencies ($TF_1$, $TF_2$, $TF_n$). It may thus be determined if the occurrence of the second segmented word ($s_2$) in the subsequent term frequency ($TF_n$) more closely corresponds to the occurrence of $s_2$ in the first term frequency ($TF_1$) or the second term frequency ($TF_2$). A similar procedure may thus be carried out for a plurality of the segmented words ($s_1$, $s_2$, ..., $s_i$) being ranked with a high weight as mentioned. This provides for a facilitated and more efficient classification of the a current machine component status, since the unique occurrence of segmented words ($s_1$, $s_2$, ..., $s_i$) in any of the reference term frequencies ($TF_1$, $TF_2$) is prioritized, whereas commonly occurring words are discarded. A defined threshold may be set for the aforementioned weight, to eliminate segmented words ($s_1$, $s_2$, ..., $s_i$) from the correlation, having associated weights below such threshold.

Determining the weighted term frequencies ($WF_1$, $WF_2$) may comprise determining 1093 a sum (D) of the occurrences of respective segmented word ($s_1$, $s_2$, ..., $s_i$) in the first and second reference term frequencies ($TF_1$, $TF_2$). Hence, for each segmented word ($s_1$, $s_2$, ..., $s_i$), the sum (D) is determined as $D=TF_1+TF_2$. The method 1000 may comprise determining an inverse frequency (ID) as the inverse of said sum (1/D). The method 1000 may further comprise determining 1094 the product (ID*$TF_1$, ID*$TF_2$) between the inverse frequency (ID) and the first and second reference term frequencies ($TF_1$, $TF_2$). FIG. 7b shows an example where the aforementioned product is determined for each of the segmented words ($s_1$, $s_2$, ..., $s_i$) and for the first and second reference term frequencies ($TF_1$, $TF_2$). The method 1000 may comprise determining 1095 the weighted term frequencies ($WF_1$, $WF_2$) based on a difference between the occurrence of the segmented words in said product (ID*$TF_1$, ID*$TF_2$). Turning to the example in FIG. 7b, the segmented word 'baaaaaaa' has the most occurrences in $TF_2$, and is also occurring five times more in $TF_2$ than in $TF_1$. The segmented word 'bbbbaaaa' is also five times more frequent in $TF_2$, but the total number of occurrences is less than for 'baaaaaaa'. The difference in the product (ID*$TF_1$, ID*$TF_2$) for 'baaaaaaa' is thus somewhat larger than for 'bbbbaaaa'. The weighted term frequency ($WF_2$), associated with the second reference term frequency ($TF_2$) may thus be set higher for the word 'baaaaaaa' than the word 'bbbbaaaa'. For the segmented word 'bbaaaabb' the difference is less, since the difference in occurrences is less, as well as for 'cbbbcccb' where the difference is even less. Thus, in a subsequent term frequency ($TF_n$), the occurrence of the words 'baaaaaaa', and 'bbbbaaaa' may be advantageously compared to the respective words in the first and second reference term frequencies ($TF_1$, $TF_2$) to determine if $TF_n$ is more closely related to $TF_1$ or $TF_2$. This provides for effectively identifying the closest match in machine status to the subsequent term frequency ($TF_n$).

As elucidated above, the weighted term frequencies ($WF_1$, $WF_2$) may be given a weight which is proportional to the difference between the occurrence of the segmented words in said product (ID*$TF_1$, ID*$TF_2$).

Segmenting the word string (S) into a sub-set of segmented words ($s_1$, $s_2$, ..., $s_i$) of the defined indexes (a, b, c, ...) may comprise extracting 1071 segmented words of a defined word length from the word string (S). The word length may be optimized depending on the particular application. The word string (S) may be stepwise segmented with a defined index step length (w), as schematically illustrated in FIGS. 3a-b.

The word string (S) may be stepwise segmented 1072 with a defined step length (w) of one index, as illustrated in the example of FIG. 3b. Thus, for each step to the next index (a, b, c, ...), the subsequent segmented word is extracted with the defined word length, e.g. 8 indexes as shown in FIG. 3b. In the example of FIG. 3a, the defined step length (w) is equal to the word length, i.e. 8 indexes.

The movement characteristics comprises vibration data of the cyclically moving machine component. The values in FIG. 1 may thus correspond to an amplitude of a vibration of the cyclically moving machine component.

As further elucidated above, the method 1000 may comprise monitoring 1120 a condition of the machine component based on the correlation of the subsequent term frequency ($TF_n$) and the first machine component status ($M^1$) and/or the second machine component status ($M^2$). The subsequently registered set of values of movement characteristics may initially be classified as having the closest correlation with the first machine component status ($M^1$), such as a calibrated reference machine component status. As the correlation is monitored over time, the closest relationship may shift to the second machine component status ($M^2$), which may be associated with a machine component having reduced functionality.

An apparatus 200 for condition monitoring of a cyclically moving machine component is also provided. As mentioned, cycles of a motion of the machine component generates measurable movement characteristics. The apparatus 200 comprises a processor 201, being schematically illustrated in FIG. 8c, which is configured to register 1010 values ($v_1$) of movement characteristics measured for the cycles; generate 1020 a frequency distribution ($F_{v1}$) of the registered values; define 1030 intervals for the occurrence of values in the frequency distribution ($F_{v1}$); associate 1040 the intervals with defined indexes (a, b, c, ...); associate 1050 the occurrence of values in the frequency distribution with respective defined indexes (a, b, c, ...) based on the intervals; generate 1060 a word string (S) of the defined indexes (a, b, c, ...) corresponding to the occurrence of values in the frequency distribution ($F_{v1}$); segment 1070 said word string (S) into a sub-set of segmented words ($s_1$, $s_2$, ..., $s_i$) of defined indexes (a, b, c, ...); determine 1080 a frequency for the occurrence of the segmented words ($s_1$, $s_2$, ..., $s_i$) in said word string (S) as a first reference term frequency ($TF_1$); associate 1090 the first reference term frequency ($TF_1$) with a first machine component status ($M^1$). The processor 201 is configured to, for a subsequently registered set of values of movement characteristics, determine 1100 a corresponding subsequent term frequency ($TF_n$), and compare 1110 the subsequent term frequency ($TF_n$) with the first reference term frequency ($TF_1$) to determine a correlation with the first machine component status ($M^1$). The apparatus 200 thus provides for the advantageous benefits as described above in relation to FIGS. 1-7.

A computer program product is provided comprising instructions which, when the program is executed by a computer, cause the computer to carry out the steps of the method 1000 as described above in relation to FIGS. 1-7.

From the description above follows that, although various embodiments of the invention have been described and shown, the invention is not restricted thereto, but may also be embodied in other ways within the scope of the subject-matter defined in the following claims.

The invention claimed is:

1. A method for condition monitoring of a cyclically moving machine component, wherein cycles of a motion of the cyclically moving machine component generates measurable movement characteristics, the method comprising:
registering values ($v_1$) of the movement characteristics measured for the cycles,
generating a frequency distribution ($F_{v1}$) of the registered values ($v_1$),
defining intervals for occurrence (F) of the registered values ($v_1$) in the frequency distribution ($F_{v1}$),
associating the defined intervals with defined indexes (a, b, c, . . . ),
associating the occurrence (F) of the registered values ($v_1$) in the frequency distribution ($F_{v1}$) with the respective defined indexes (a, b, c, . . . ) based on the defined intervals,
generating a word string (S) of the defined indexes (a, b, c, . . . ) corresponding to the occurrence (F) of the registered values ($v_1$) in the frequency distribution ($F_{v1}$),
segmenting said word string (S) into a sub-set of segmented words ($s_1, s_2, \ldots, s_i$) of the defined indexes (a, b, c, . . . ),
determining a frequency of occurrence of the segmented words ($s_1, s_2, \ldots, s_i$) in said word string (S) as a first reference term frequency ($TF_1$),
associating the first reference term frequency ($TF_1$) with a first machine component status ($M^1$),
for a subsequently registered set of values of the movement characteristics, determining a corresponding subsequent term frequency ($TF_n$), and
comparing the subsequent term frequency ($TF_n$) with the first reference term frequency ($TF_1$) to determine a correlation with the first machine component status ($M^1$).

2. The method according to claim 1, comprising:
determining a second reference term frequency ($TF_2$) for the values ($v_1$) of the movement characteristics measured for a second machine component status ($M^2$),
comparing said subsequent term frequency ($TF_n$) with the first and second reference term frequencies ($TF_1, TF_2$) to determine a current machine component status, being associated with the subsequent term frequency ($TF_n$), as said first or second machine component status ($M^1, M^2$).

3. The method according to claim 2, comprising:
determining weighted term frequencies ($WF_1, WF_2$) of the first and second reference term frequencies ($TF_1, TF_2$) based on a difference between the occurrence of the segmented words ($s_1, s_2, \ldots, s_i$) in the first and second reference term frequencies ($TF_1, TF_2$),
comparing said subsequent term frequency ($TF_n$) with the weighted term frequencies ($WF_1, WF_2$) to determine said current machine component status.

4. The method according to claim 3, wherein the determining the weighted term frequencies ($WF_1, WF_2$) comprises:
determining a sum (D) of the occurrences of respective segmented word ($s_1, s_2, \ldots, s_i$) in the first and second reference term frequencies ($TF_1, TF_2$),
determining an inverse frequency (ID) as the inverse of said sum (1/D),
determining a product ($ID*TF_1, ID*TF_2$) of the inverse frequency (ID) and the first and second reference term frequencies ($TF_1, TF_2$),
determining the weighted term frequencies ($WF_1, WF_2$) based on a difference between the occurrence of the segmented words ($s_1, s_2, \ldots, s_i$) in said product ($ID*TF_1, ID*TF_2$).

5. The method according to claim 4, wherein the weighted term frequencies ($WF_1, WF_2$) are given a weight which is proportional to the difference between the occurrence of the segmented words ($s_1, s_2, \ldots, s_i$) in said product ($ID*TF_1, ID*TF_2$).

6. The method according to claim 1, wherein the segmenting said word string (S) into the sub-set of the segmented words ($s_1, s_2, \ldots, s_i$) of the defined indexes (a, b, c, . . . ) comprises:
extracting segmented words of a defined word length from said word string (S),
wherein said word string (S) is stepwise segmented with a defined index step length (w).

7. The method according to claim 5, wherein said word string (S) is stepwise segmented with a defined step length (w) of one index.

8. The method according to claim 1, wherein the movement characteristics comprise vibration data of the cyclically moving machine component.

9. The method according to claim 1, wherein the first machine component status ($M^1$) corresponds to the cyclically moving machine component that has been calibrated.

10. The method according to claim 2, wherein the second machine component status ($M^2$) corresponds to the cyclically moving machine component having reduced functionality.

11. The method according to claim 1, comprising monitoring a condition of the cyclically moving machine component based on said correlation.

12. A non-transitory storage medium comprising instructions which, when executed by a computer, cause the computer to carry out the steps of the method according to claim 1.

13. The method of claim 2, wherein the first machine component status ($M^1$) corresponds to a normal status of the cyclically moving machine component and the second machine component status ($M^2$) corresponds to a reduced functionality of the cyclically moving machine component, and wherein a determination that the current machine component status is the second machine component status ($M^2$) causes performing maintenance or replacement of the cyclically moving machine component.

14. An apparatus for condition monitoring of a cyclically moving machine component, wherein cycles of a motion of the cyclically moving machine component generates measurable movement characteristics, the apparatus comprising:
a processor configured to
register values ($v_1$) of the movement characteristics measured for the cycles,
generate a frequency distribution ($F_{v1}$) of the registered values ($v_1$),
define intervals for occurrence (F) of the registered values ($v_1$) in the frequency distribution ($F_{v1}$),
associate the defined intervals with defined indexes (a, b, c, . . . ),
associate the occurrence (F) of the registered values ($v_1$) in the frequency distribution ($F_{v1}$) with the respective defined indexes (a, b, c, . . . ) based on the defined intervals,
generate a word string (S) of the defined indexes (a, b, c, . . . ) corresponding to the occurrence (F) of the registered values ($v_1$) in the frequency distribution ($F_{v1}$), segment said word string (S) into a sub-set of segmented words ($s_1, s_2, \ldots, s_i$) of the defined indexes (a, b, c, ...), determine a frequency of occurrence of the segmented words ($s_1, s_2, \ldots, s_i$) in said word string (S) as a first reference term frequency ($TF_1$), associate the first reference term frequency ($TF_1$) with a first machine component status ($M^1$), for a subsequently registered set of values of the movement characteristics, determine a corresponding subsequent term frequency ($TF_n$), compare the subsequent term frequency ($TF_n$) with the first reference term frequency ($TF_1$) to determine a correlation with the first machine component status ($M^1$).

15. The apparatus of claim 14, wherein the processor is configured to:

determine a second reference term frequency ($TF_2$) for the values ($v_1$) of the movement characteristics measured for a second machine component status ($M^2$), compare said subsequent term frequency ($TF_n$) with the first and second reference term frequencies ($TF_1, TF_2$) to determine a current machine component status, being associated with the subsequent term frequency ($TF_n$), as said first or second machine component status ($M^1, M^2$).

16. The apparatus of claim 15, wherein the first machine component status ($M^1$) corresponds to a normal status of the cyclically moving machine component and the second machine component status ($M^2$) corresponds to a reduced functionality of the cyclically moving machine component, and wherein a determination that the current machine component status is the second machine component status ($M^2$) causes performing maintenance or replacement of the cyclically moving machine component.

17. The apparatus of claim 14, wherein the processor is configured to segment said word string (S) into the sub-set of the segmented words (s1, s2, . . . , si) of the defined indexes (a, b, c,. . . ) by:

extracting segmented words of a defined word length from said word string (S), wherein said word string (S) is stepwise segmented with a defined index step length (w).

18. The apparatus of claim 14, wherein the movement characteristics comprise vibration data of the cyclically moving machine component.

* * * * *